United States Patent [19]
Thomas

[11] Patent Number: 6,128,663
[45] Date of Patent: *Oct. 3, 2000

[54] METHOD AND APPARATUS FOR CUSTOMIZATION OF INFORMATION CONTENT PROVIDED TO A REQUESTOR OVER A NETWORK USING DEMOGRAPHIC INFORMATION YET THE USER REMAINS ANONYMOUS TO THE SERVER

[75] Inventor: C. Douglass Thomas, Campbell, Calif.

[73] Assignee: Invention Depot, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/021,177

[22] Filed: Feb. 10, 1998

Related U.S. Application Data

[60] Provisional application No. 60/037,506, Feb. 11, 1997.

[51] Int. Cl.$^7$ ........................................ G06F 15/16
[52] U.S. Cl. .................. 709/228; 709/217; 709/219; 709/227; 709/229
[58] Field of Search ........................ 709/217, 219, 709/224, 208, 206, 228; 705/10

[56] References Cited

U.S. PATENT DOCUMENTS

| | | |
|---|---|---|
| 5,661,516 | 8/1997 | Carles . |
| 5,712,979 | 1/1998 | Graber et al. . |
| 5,734,838 | 3/1998 | Robinson et al. . |
| 5,749,081 | 5/1998 | Whiteis . |
| 5,761,647 | 6/1998 | Boushy . |
| 5,761,648 | 6/1998 | Golden et al. . |
| 5,764,235 | 6/1998 | Hunt et al. . |
| 5,774,869 | 6/1998 | Toader . |
| 5,794,210 | 8/1998 | Goldhaber et al. . |
| 5,809,242 | 9/1998 | Shaw et al. ............................. 709/217 |
| 5,848,396 | 12/1998 | Gerace . |
| 5,848,397 | 12/1998 | Marsh et al. . |
| 5,850,433 | 12/1998 | Rondeau ................................ 379/201 |
| 5,897,622 | 4/1999 | Blinn et al. ............................. 705/26 |
| 5,915,001 | 6/1999 | Uppaluru ............................ 379/88.22 |
| 5,925,100 | 7/1999 | Drewry et al. ........................ 709/219 |
| 5,931,901 | 9/1999 | Wolfe et al. . |
| 5,948,061 | 9/1999 | Merriman et al. . |
| 6,041,357 | 3/2000 | Kunzelman et al. ................... 709/228 |

OTHER PUBLICATIONS

Yahoo! Inc., "Web Users Create Their Own My Yahoo!", Press Release, Jul. 15, 1996.

Firefly Network, Inc., "Firefly Network Provides Open Approach For A Personalized and Measureable Web Experience", Press Release, Dec. 3, 1996.

Yahoo! Inc., "My Yahoo! Makes the Web Even More Personal", Press Release, Dec. 9, 1996.

Firefly Network, Inc., "Firefly Network and Yahoo! Offer Consumers Ability to Intelligently Navigate the Web", Press Release, Dec. 11, 1996.

(List continued on next page.)

*Primary Examiner*—Zarni Maung
*Assistant Examiner*—Paul Kang

[57] ABSTRACT

Improved techniques for customizing information provided from a content server through a network to a user of a computer system in accordance with demographic classifications, user interests, or preferences are disclosed. Such customizing can involve banner advertising on the Internet whereby the advertising banners are able to be targeted to the user. The customizing can also involve altering portions of a web page to be displayed to the user so that the web page is more effective, useful or desirable for the user. Besides customization of the information to be displayed to the user, the invention also provides techniques for obtaining demographic information about the user of the computer system, and techniques for transmitting the demographic information over the network so that remote content servers that provide information content to the user can do so with knowledge of the demographic information about the user.

19 Claims, 14 Drawing Sheets

OTHER PUBLICATIONS

Firefly Network, Inc., "Firefly Network Extends Open Platform for Personalized Web Site or Desktop Applications", Press Release, Feb. 3, 1997.

NetGravity, Inc., "NetGravity Launches AdServer, the Premier Advertising Management System Software for World Wide Web Publishers", Press Release, Jan. 31, 1996.

BroadVision Inc., "BroadVision Unleashes the Power of the Internet with Personalized Marketing and Selling," Press Release, Jan. 22, 1996.

NetGravity, Inc., "NetGravity Launches AdServer 2.1, Significant Enhancements Make Online Advertising More Reliable, Efficient, and Manageable", Press Release, Jan. 13, 1997.

Hotmail, "Hotmail Provides Web–Based Free E–mail To The World On Independence Day," Press Release, Jul. 1, 1996.

Hotmail, "Hotmail Tops 100,000 Subscribers," Press Release, Sep. 6, 1996.

Hotmail, "Hotmail Subscriber Base Doubles to 500,000 in One Month," Press Release, Nov. 11, 1996.

Hotmail, "Hotmail Subscriber Base Tops One Million," Press Release, Jan. 21, 1997.

PointCast, "PointCast Unveils First News Network that Reaches Viewers at Their Desktops," Press Release, Feb. 13, 1996.

PointCast, "PointCast Announces Dramatic Enhancements to Advertiser Services," Press Release, Jun. 26, 1996.

PointCast, "PointCast Announces Advertising Sales to Major Sponsors," Press Release, Jul. 19, 1997.

Wasserman, "Cyber trails to you," San Jose Mercury News, Dec. 6, 1996.

Netscape Web Site Advertising Opportunities, Netscape Communications Corporation, 1997.

"Real Ads for Real Money," (CyberGold) PC Magazine, p. 9, Jan. 7, 1997.

Ad Targeting, Banner Delivery, and Criteria, DoubleClick, Inc., (http://www.doubleclick.net/nf/adinfo/).

Advertising Opportunities, Hotmail Corporation, (http://www.hotmail.com/), 1996–97.

Hallam–Baker et al., "Session Identification URI," W3C Working draft, (http://www.w3.org/pub/WWW/TR/WD–session–id–960221.html), Feb. 21, 1996.

Mutz et al., "User–Agent Display Attributes," HTTP Working Group, Internet Draft, (http://www.ics.uci.edu/pub/ietf/http/), Aug. 12, 1996.

Fielding et al., "Hypertext Transfer Protocol—HTTP/1.1," HTTP Working Group, Internet Draft, (http://www.ics.uci.edu/pub/ietf/http/), Aug. 12, 1996.

Holtman, "Content negotiating user agent extension," v1.1, Sep. 2, 1996.

Dunn et al., "Privacy and Profiling on the Web," Microsoft Corporation, (http://www.w3.org/TR/NOTE–Web–privacy.html), Jun. 2, 1997.

Hensley et al., "Proposal for Open Profiling Standard," Firefly Network, Inc., (http://www.w3.org/TR/NOTE–OPS–FrameWork.html), Jun. 2, 1997.

Netscape Communications Corp., "Netscape, Friefly and Versign Propose Open Profiling Standard (OPS) to Enable Broad Personalization of Internet Services," Press Release, May 27, 1997.

"Open Profiling Standard (OPS) Frequently Asked Questions," Netscape Communications Corp., May 27, 1997.

Firefly Network, Inc., "Proposal for an Open Profiling Standard," Version 1.0, Jun. 2, 1997.

METHOD AND APPARATUS FOR CUSTOMIZATION OF INFORMATION CONTENT PROVIDED TO A REQUESTOR OVER A NETWORK USING DEMOGRAPHIC INFORMATION YET THE USER REMAINS ANONYMOUS TO THE SERVER

CROSS REFERENCE TO RELATED APPLICATION

This application claims priority benefit from U.S. Provisional Application No. 60/037,506, filed Feb. 11, 1997, which is hereby incorporated by reference in its entirety. This application is also related to U.S. application Ser. No. 08/886,349, filed on Jul. 1, 1997, now abandoned, which is hereby incorporated by reference in its entirety.

BACKGROUND OF THE INVENTION

1. Field of the Invention

The present invention relates to providing demographic information over a network. The present invention also relates to customization of web pages and electronic advertising on web pages.

2. Description of the Related Art

It is known to display an advertising banner at the upper portion of web pages to advertise products and services on the Internet. Usually, an advertising banner is randomly selected from a selection of advertisers. Although such advertising has been shown to be effective, it is very inefficient because the advertising banners may advertise particular products and services for which the viewing user would have little or no interest in purchasing. The only correlation with the interest of users is when the particular web page being viewed by a user was of interest to the user and the advertising banner was also somehow related to the content of the web page. For example, a web page of a real estate company might include advertising banners containing advertisements for mortgage companies.

A popular Internet search engine know as "Yahoo!" displays advertising banners on an upper portion of its web pages. Yahoo! appears to select a banner advertisement to display in accordance with a user's search request to the Yahoo! Internet search engine. For example, if you enter a search request for "music", the banner advertisement that is displayed on the next displayed Yahoo! page would contain a music related advertisement. FIGS. 7–11 are graphical images of a series of web pages provided by Yahoo! for the example "music" search request example. Note that the advertising banner for "Music Connection" illustrated in FIG. 11 is the music related advertisement being displayed. This approach of Yahoo! which uses search terms tends to more be more efficient in selecting the advertising banner than the more common random selection. However, the Yahoo! approach remains inefficient because Yahoo! does not have any idea as to who is using the Yahoo! Internet search engine. As a result, advertising banners are still not able to be efficiently selected such that the advertising banner is targeted to the user or requester.

Thus, there is a need for improved banner advertising on the Internet whereby the advertising banners displayed or other portions of a web page are targeted and/or customized to a user so that the web page is more effective.

SUMMARY OF THE INVENTION

The invention pertains to techniques for customizing information provided from a content server through a network to a user of a computer system in accordance with demographic classifications, user interests, preferences or other demographic information. Such customizing can involve banner advertising on the Internet whereby the advertising banners are able to be targeted to the user. The customizing can also involve altering portions of a web page to be displayed to the user so that the web page is more effective, useful or desirable for the user. Besides customization of the information to be displayed to the user, the invention also provides techniques for obtaining demographic information about the user of the computer system, and techniques for transmitting the demographic information over the network so that remote content servers that provide information content to the user can do so with knowledge of the demographic information about the user.

The invention can be implemented in numerous ways, including as a method, an apparatus, a system, or a computer readable media.

As a method for providing demographic information on a computer network user to machines in the computer network, an embodiment of the invention includes the acts of: obtaining demographic information on the computer network user; associating at least a portion of the demographic information to a remote page request, the remote page request being directed to a remote server machine in the computer network; and transmitting the remote page request with at least the portion of the demographic information to the remote server machine over the computer network.

As a computer implemented method for utilizing demographic information over a network of computers, an embodiment of the invention includes the acts of: identifying a user that has accessed a remote web page over the network; retrieving demographic information associated with the user; and modifying the remote web page for the user based on the demographic information or selecting a previously modified version of the remote web page for the user based on the demographic information.

As a method for customizing web pages provided over a network, an embodiment of the invention includes the acts of: receiving, at a server computer, a page request issued by a requestor over the network from a requestor's computer; retrieving demographic information on the requestor stored on the requestor's computer and supplying the demographic information to the server computer; customizing a web page to be displayed on the requestor's computer in response to the page request based on the demographic information; and transmitting the customized web page to the requestor's computer for display thereon.

As a method for providing advertisements on HTML pages provided over a network, an embodiment of the invention includes the acts of: receiving a HTML page request having a demographics identifier associated therewith, the HTML page request being received from a requester over the network; identifying a data file associated with the HTML page request; identifying an advertising banner within the HTML page requested; selecting one of a plurality of available image files for the identified advertising banner based on the demographics identifier; and transmitting over the network to the requester the data file associated with the HTML page requested and the selected image file.

Advantages of the invention are numerous. First, the user is able to receive customized information without having to undergo a burdensome registration or login process for each content server (web site) visited. Second, the demographic classifications, user interests, preferences or other type of demographic information can provide privacy because the various content servers (web sites) visited by the user would not obtain personal information about the user such as name, address, and phone number. Third, the same the demographic classifications, interests, preferences or other type of demographic information can be used by all interested content servers instead of each content server attempting to determine a users identity by their own efforts. Fourth, demographic information on a user of a network can be transmitted over the network, even when the network uses a connectionless protocol (e.g., the Internet). Hence, the demographic information on the user could follow the user on the network so that the server to which the user is visiting would be aware of the demographic characteristics of the user. Fifth, if desired, the distribution of the demographic information can be controlled. For example, a demographics identifier could have a controlled distribution to referring sites or any other sites for registered users such that these authorized sites would be able to identify the demographic characteristics of the user. Sixth, once the user's demographic characteristics are identified, the content provider sites are able to provide customization or appropriate content to the user.

Other aspects and advantages of the invention will become apparent from the following detailed description, taken in conjunction with the accompanying drawings, illustrating by way of example the principals of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
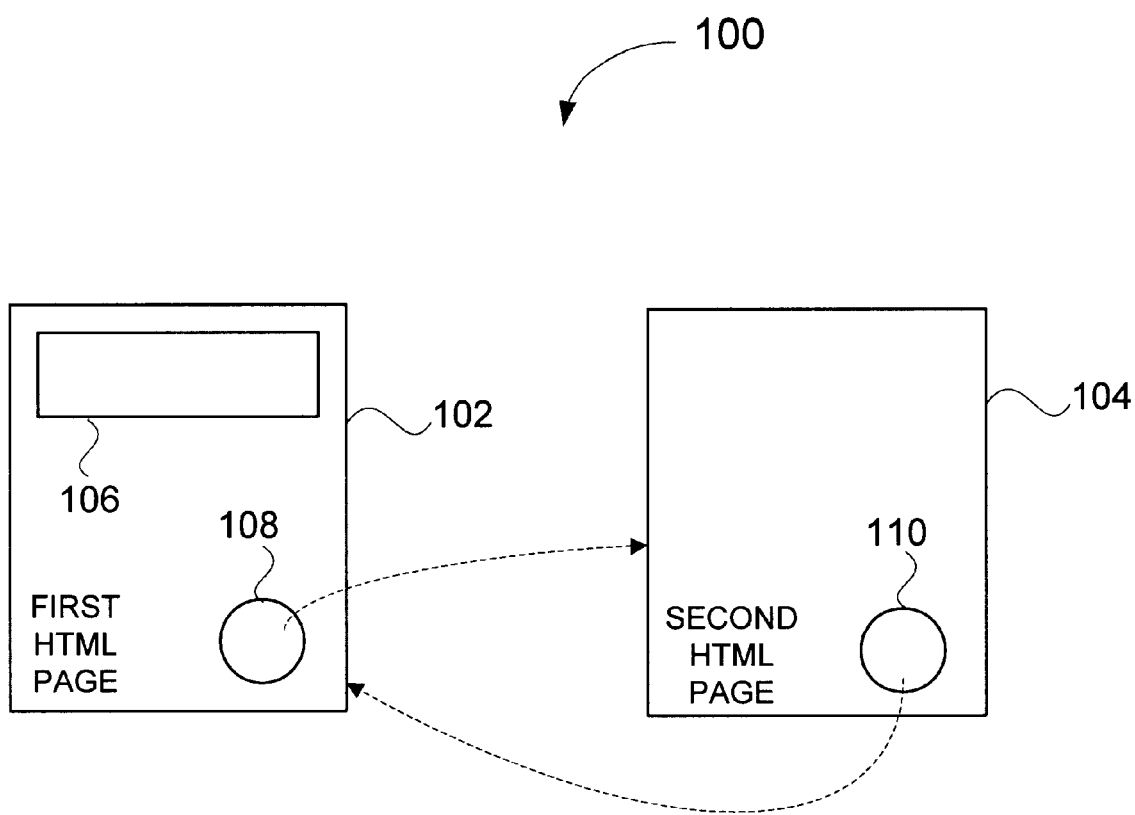
FIG. 1 is a pictorial diagram of a network-based demographic identification system according to an embodiment of the invention.

The invention pertains to techniques for customizing information provided from a content server to a user of a computer system through a network in accordance with demographic classifications, user interests, preferences, or other demographic information. Such customizing can involve banner advertising on the Internet whereby the advertising banners are able to be targeted to the user. The customizing can also involve altering portions of a web page to be displayed to the user so that the web page is more effective, useful or desirable for the user. Besides customization of the information to be displayed to the user, the invention also provides techniques for obtaining demographic information about the user of the computer system, and techniques for transmitting the demographic information over the network so that remote content servers that provide information content to the user can do so with knowledge of the demographic information about the user. The network is preferably the Internet or an intranet.

The demographic information broadly encompasses a wide range of information pertaining to a user. More particularly, the demographic information can pertain to demographic categories, user interests, preferences (user or system), hobbies, user's preferred greeting name, and the like. User preferences can include a wide range of items such as preferences for Internet page formats and resolution, types, language, dislikes, likes, customization desired, etc.

The acquisition of the demographic information can be performed either by a remote server or a local browser. In the case of the remote server, the remote server encourages the user to login to or register with one of its web pages so that the remote server can identify the user against its database of users. Once the user is identified, the remote server determines or retrieves an appropriate demographic identifier for the user. In the case of a local browser, the local browser can have available to it the appropriate demographic identifier by previously storing the appropriate demographic identifier on a local machine that hosts the local browser. The previous determination of the appropriate identifier can be performed in a variety of ways, including by a remote server login or registration as noted above or by a local determination by the local browser or local machine.

In either case, once the appropriate demographic identifier is known, it can be transmitted between remote servers and/or between a local browser and a remote server in various ways. One way is to embed the demographic identifier into the pages being delivered by the remote server to the local browser. The local browser can thereafter store the demographic identifier, perform local customization, and/or transmit the demographic identifier to other remote servers with or following a request. Another way is to forward to the demographic identifier with (or following) a request (e.g., HTTP Request). For example, the demographic identifier can be transmitted over the network by appending the demographic identifier to a request (e.g., appended to URL or in a HTTP header).

A remote server receiving a page request (e.g., from such modified pages or modified page requests) is able to obtain the demographic identifier and use the demographics identifier to modify the content of the requested page to be transmitted over the network to the user such that it is more appropriate for the user. For example, the requested page often includes an advertising banner, and according to the invention, the particular advertising banner that is chosen to be transmitted with the requested page is determined, not randomly, but in accordance with the demographics identifier. Other modification could also be made such as providing a greeting, selecting an appropriate variant of the requested page or portion thereof, etc.

FIG. 1 is a pictorial diagram of a network-based demographic identification system 100 according to an embodiment of the invention. The network-based demographic identification system 100 includes a first HTML page 102 and a second HTML page 104. The pictorial diagram illustrated in FIG. 1 illustrates interaction between the first HTML page 102 and the second HTML page 104. The first HTML page 102 is assumed to be displayed on a display screen to a user, and the second HTML page 104 is assumed to be a subsequent page that is displayed on the display screen to the user. The display screen on which the pages are displayed is part of a computer system. The user obtains the pages through use of an application program known as a network browser. Popular and commercially available network browsers include Netscape Navigator and Microsoft Internet Explorer.

In one embodiment, the first HTML page 102 includes a banner advertising region 106 and a referral command button 108. More generally, the referral command button 108 is a link to another HTML page. When the first HTML page 102 is displayed on the display screen to a user, the content of the banner advertising region 106 is typically randomly selected and displayed as an image portion of the first HTML page 102. When the user selects the referral command button 108, the first HTML page 102 refers the user to the second HTML page 104. In doing so, the second HTML page is displayed on the display screen to the user (via the network browser) and the first HTML page 102 is removed. Consequently, the referral command button 108 of the first HTML page 102 operates as a link to the second HTML page 104.

The content of the second HTML page 104 can take numerous different forms and objectives. Preferably, however, the second HTML page 104 provides for user identification or demographic information about the user. By user interaction with the second HTML page 104, the second HTML page 104 (or its server supplying the second HTML page 104) is able to identify the user or demographic information about the user.

The identification or the demographic information is then forwarded back to the first HTML page 102. The second HTML page 104 preferably includes a return command button 110. More generally, the return command button 110 is a link. When the return command button 110 is selected by the user, the second HTML page 104 operates to link back to the first HTML page 102 which referred the user to the second HTML page 104. In so doing, the second HTML page 104 also sends back to the referring page (the first HTML page 102) user information or a user demographics identifier that serves to provide demographic information about the user. Thereafter, the first HTML page 102 is able to utilize the user information or a user demographics identifier to alter the contents of the first HTML page 102 such that it is more suitable for the user. As an example, the banner advertising region 106 may be customized to select an advertisement more suitable for the user. Hence, the invention facilitates targeted advertising over the network while having the ability to maintain the privacy of the user.

Figure 2:
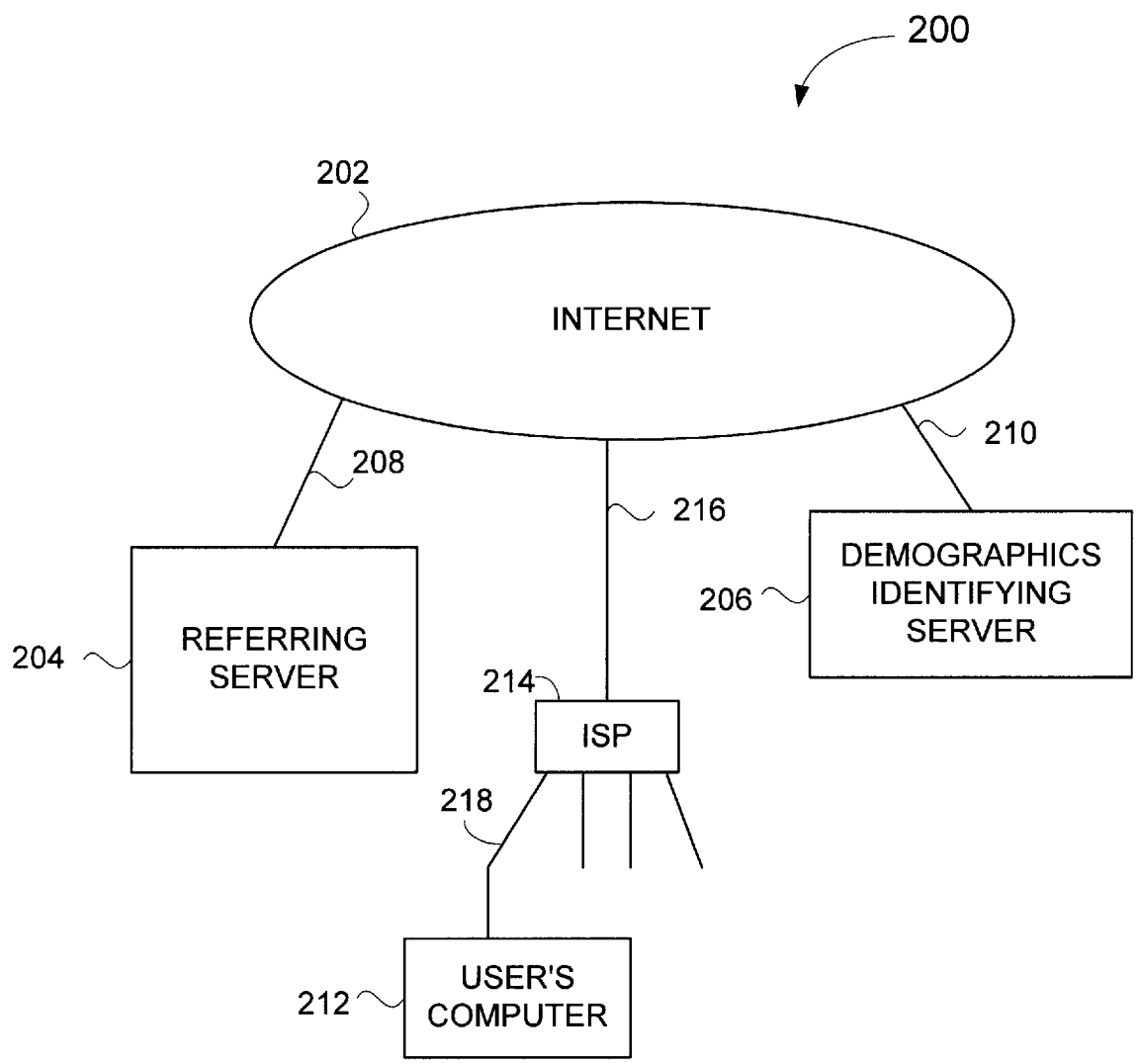
FIG. 2 is a diagram of a networked computer system according to an embodiment of the invention.

FIG. 2 is a diagram of a networked computer system 200 according to an embodiment of the invention. The networked computer system 200 includes the Internet 202 as the network backbone, a referring server 204 and a demographics identifying server 206. The referring server 204 is coupled to the Internet 202 through a high speed data link 208, and the demographics identifying server 206 is coupled to the Internet 202 through a high speed data link 210. A user's computer 212 also couples to the Internet 202 through an Internet service provider (ISP) 214. In particular, the ISP 214 couples to the Internet 202 through a high speed data link 216, and the ISP 214 couples to the user's computer 212 through a phone line 218 and modem.

The networked computer system 200 is suitable for supporting the network-based demographic identification system 100 illustrated in FIG. 1. In particular, with respect to FIG. 1, the first and second HTML pages 102 and 104 are displayed on the user's computer 212. The first HTML page 102 is provided by the referring server 204 and the second HTML page 104 is supplied by the demographics identifying server 206. Initially, a user of the user's computer 212 will enter a universal resource locator (URL) or a page request via a network browser to a remote server over the Internet 202. The page request will be sent to the referring server 204, and then the requested page (e.g., the first HTML page 102) residing at the referring server 204 will be forwarded from the referring server 204 to the user's computer 212 over the Internet 202 where it will be displayed to the user. Thereafter, when the user selects the referral command button 108 on the first HTML page 102, a URL or page request for the second HTML page 104 is sent to the demographics identifying server 206 via the network browser over the Internet 202. The demographics identifying server 206 will forward the requested page back to the user's computer 212 over the Internet. Through user interaction with the demographics identifying server 206 or the second HTML page 104, demographic information about the user is obtained. Thereafter, when the user selects the return command button 110 on the second HTML page 104, a page request for the first HTML page 102 is sent to the referring server 204 via the network browser over the Internet 202 because the first HTML page 102 was the page that referred the user to the second HTML page 104. However, with this page request, the invention provides demographic information back to the referring page, that is, the first HTML page 102. The referring server 204 that receives the demographic information is then able to select a more appropriate variant and/or perform customization of certain features of the first HTML page 102. In particular, using the demographic information, the banner advertising region 106 can be changed or altered such that it is more appropriate for the user involved in these transactions. This referral approach offers a great deal of control over the demographic information which can have significant financial value.

However, if less control over the demographic information is acceptable, then the demographic information can be stored locally on the user's computer 212. The determination of the demographic information can be done by processing running on the user's computer 212 or by the user visiting the demographics identifying server 206. Once determined, the demographic information can be stored locally then can be repeatedly used thereafter. With this approach, a page request to the referring server 204 can include the demographic information (or indicate it availability) and thus the referring server 204 obtains the demographic information without having to refer the user to the demographics identifying server 206.

Of course, a user could also go to the demographic identifying server 206 initially. This would facilitate early determining of the demographic information without requiring referrals even when the demographic information is not locally available on the user's computer.

Figure 2A:
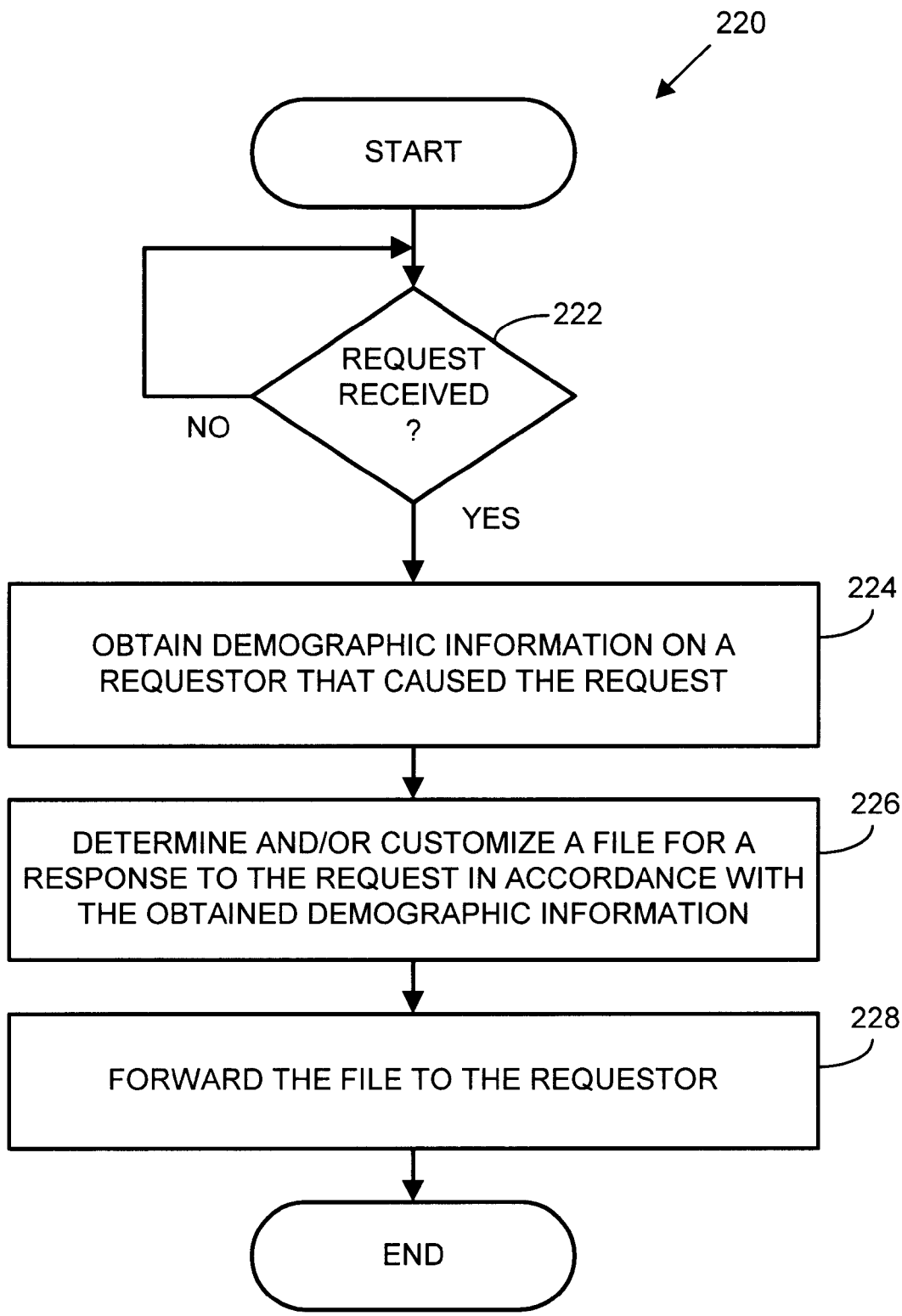
FIG. 2A is a flow diagram of content control processing provided by an embodiment of the invention.

FIG. 2A is a flow diagram of content control processing 220 provided by an embodiment of the invention. The content control processing 220 is performed by a content server (remote server) of a network of computers. The content control processing 220 initially determines 222 whether a request has been received. As examples, the request can be a HTTP Request or a HTTP Get Request. Until a request is received, the content control processing 220 is idle.

Once a request is determined to be received, the content control processing 220 continues. Demographic information on the requestor that caused the request is obtained 224. Next, a file for a response to the request is determined and/or customized 228 in accordance with the obtained demographic information. As examples, the file can be a HTML file or an image file. Also, the determining of the file can select from available variants for the requested page based on the demographic information, and the customizing can modify a file for the requested page such that its content is more suitable to the requestor's demographic information or otherwise personalized to the requester. After the file is determined or customized, the file is forwarded 228 to the requestor.

Figure 2B:
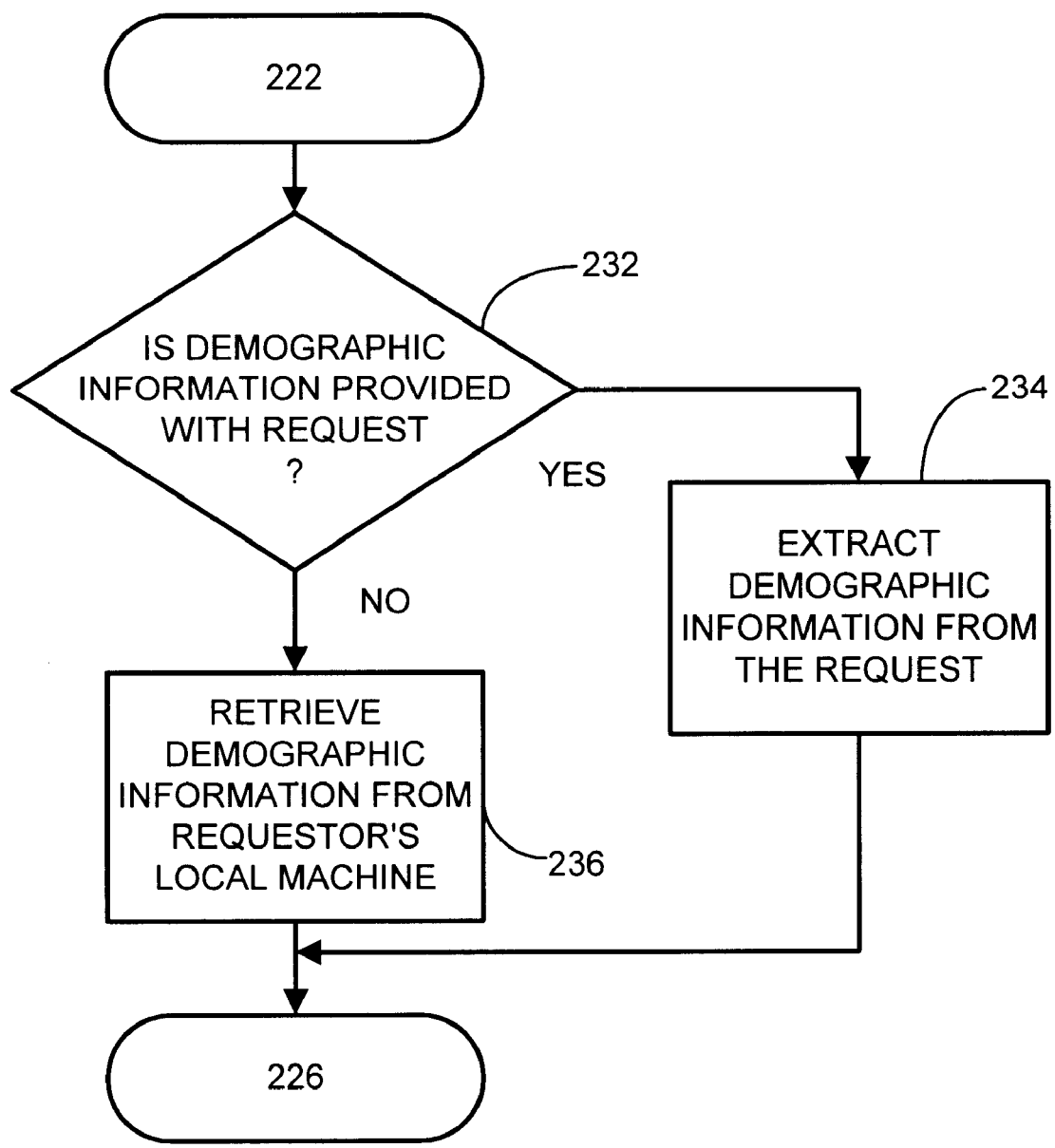
FIG. 2B is a flow diagram of operations associated with block 224 of FIG. 2A according to one embodiment.

FIG. 2B is a flow diagram of operations associated with block 224 of FIG. 2A according to one embodiment. The obtaining of the demographic information begins in this embodiment by a decision block 232. The decision block 232 determines whether demographic information is provided with the request. The demographic information can be provided with the request in various ways, including appended to a URL or in a header associated with the request. The demographic information can also be provided via the requestor's local machine or a demographic identifying server. When the decision block 232 determines that the demographic information is provided with the request, then the demographic information is extracted 234 from the request. On the other hand, when the demographic information is not provided with the request, then the demographic information is retrieved 236 from the requestor's local machine. Of course, if the demographic information is not available from either the request or the requestor's local machine, then the content control processing 220 would forward the requestor a file that had not undergone the beneficial determination or customization; however, the demographic information could be subsequently determined by referring the requestor to a demographic identifying server. Following blocks 236 and 234, the processing returns to block 226 of the content control processing 220 illustrated in FIG. 2A.

Figure 3A:
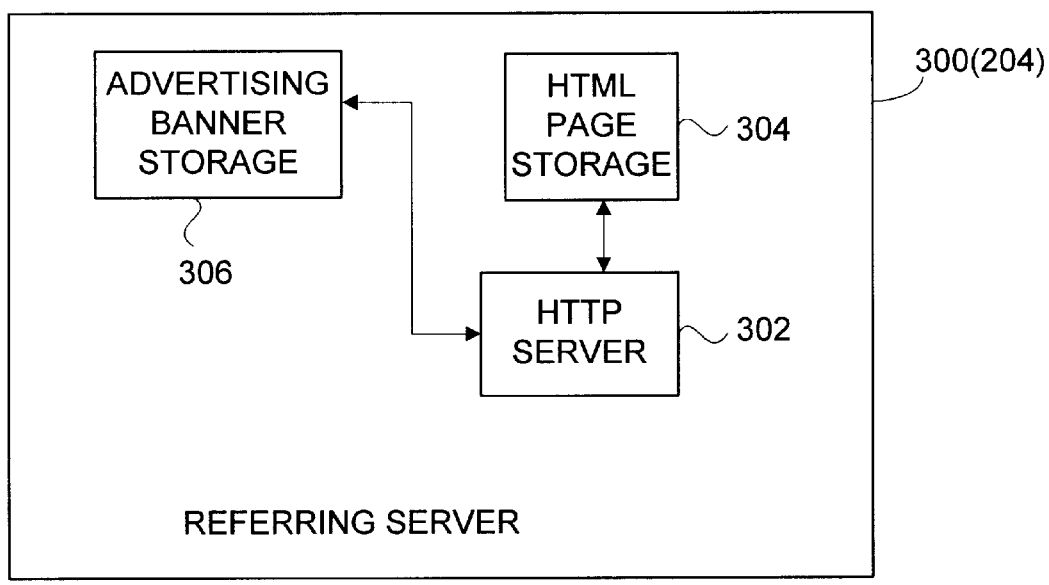
FIG. 3A is an embodiment of a referring server according to an embodiment of the invention.

FIG. 3A is an embodiment of a referring server 300 according to an embodiment of the invention. The referring server 300 is a detailed embodiment of the referring server 204 illustrated in FIG. 2. The referring server 300 includes a HTTP server 302, a HTML page storage 304, and an advertising banner storage 306. Upon receiving a page request, the HTTP server 302 retrieves a HTML page file from the HTML page storage 304 and retrieves an advertisement banner file associated with the retrieved HTML page storage 304 from the advertising banner storage 306. The retrieved files are then transmitted to the demographics identifying server 206 through the Internet 202. Alternatively, the advertising banner storage 306 is provided by a remotely located third-party server.

Figure 3B:
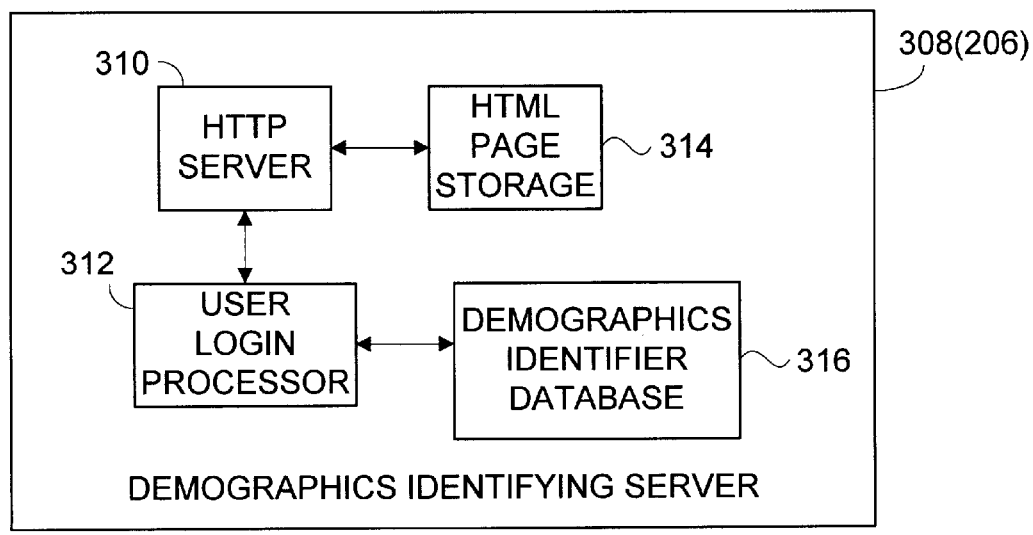
FIG. 3B is an embodiment of a demographics identifying server according to an embodiment of the invention.

FIG. 3B is an embodiment of a demographics identifying server 308 according to an embodiment of the invention. The demographics identifying server 308 is a detailed embodiment of the demographics identifying server 206 illustrated in FIG. 2. The demographics identifying server 308 includes a HTTP server 310, a user login processor 312, a HTML page storage 314, and a demographics identifier database 316. Upon receiving a page request, the HTTP server 310 retrieves a HTML page file from the HTML page storage 314 and then transmits the retrieved HTML page file to the user's computer 212 through the Internet. The initial page request may be a login page in which the user is able to login to the demographics identifying server 308. As an example, the user can login using a user name and password which are enter by the user and transmitted to the user login processor 312 that determines whether the login request of the user is accepted or denied. Once the user has completed the login, the demographics identifying server 308 is able to retrieve a demographics identifier for the user from the demographics identifier database 316. Thereafter, the demographics identifier can be transmitted to the user's computer through the Internet 202. The transmission of the demographic identifier can be transmitted to the referring server 204 when convenient so that the referring server 204 is able to alter its content to the user when the user is returned to the referring server 204 from the demographics identifying server 206.

Figure 4A:
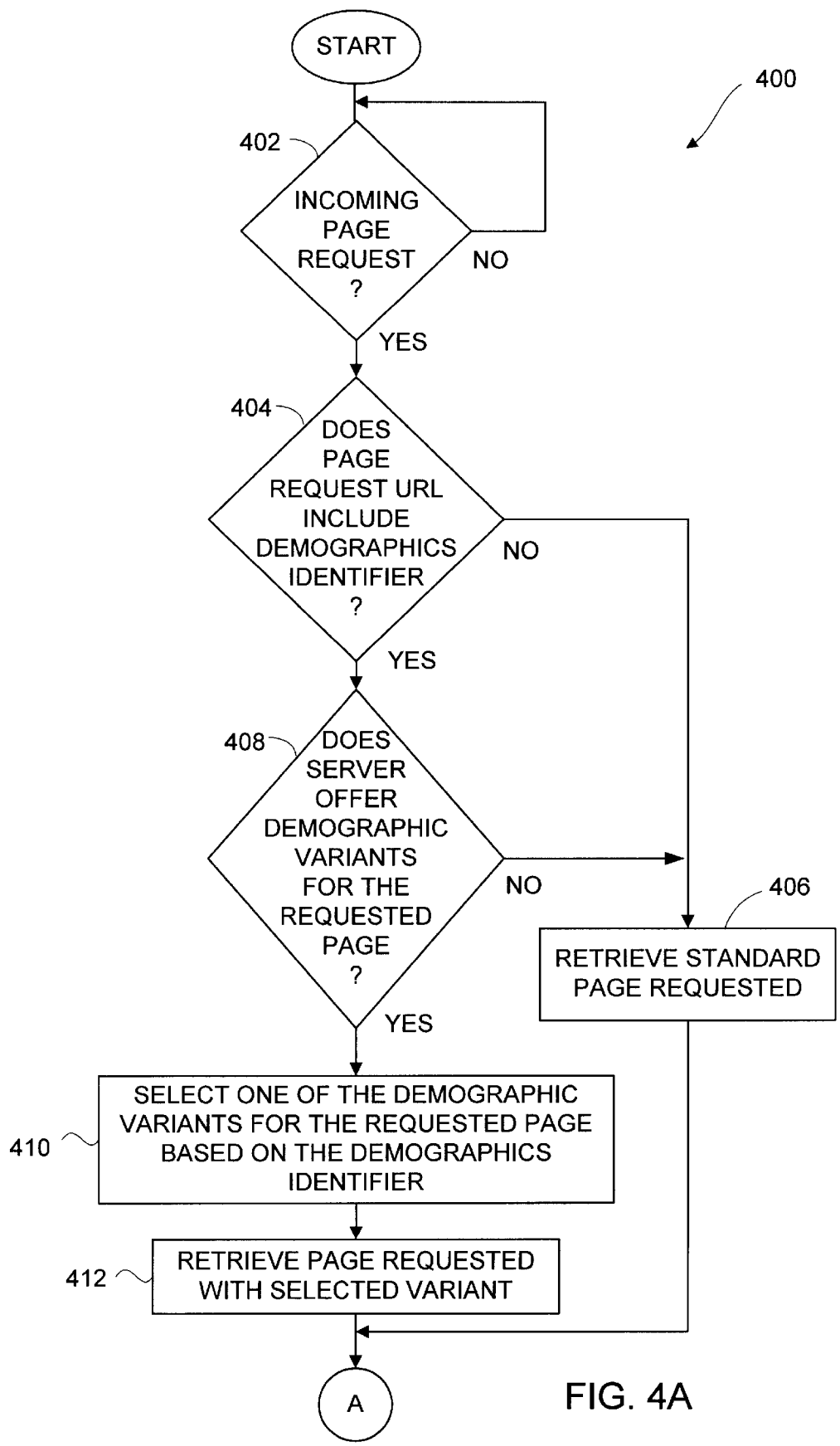
FIGS. 4A and 4B are flow diagrams of referring server processing according to an embodiment of the invention.
Figure 4B:
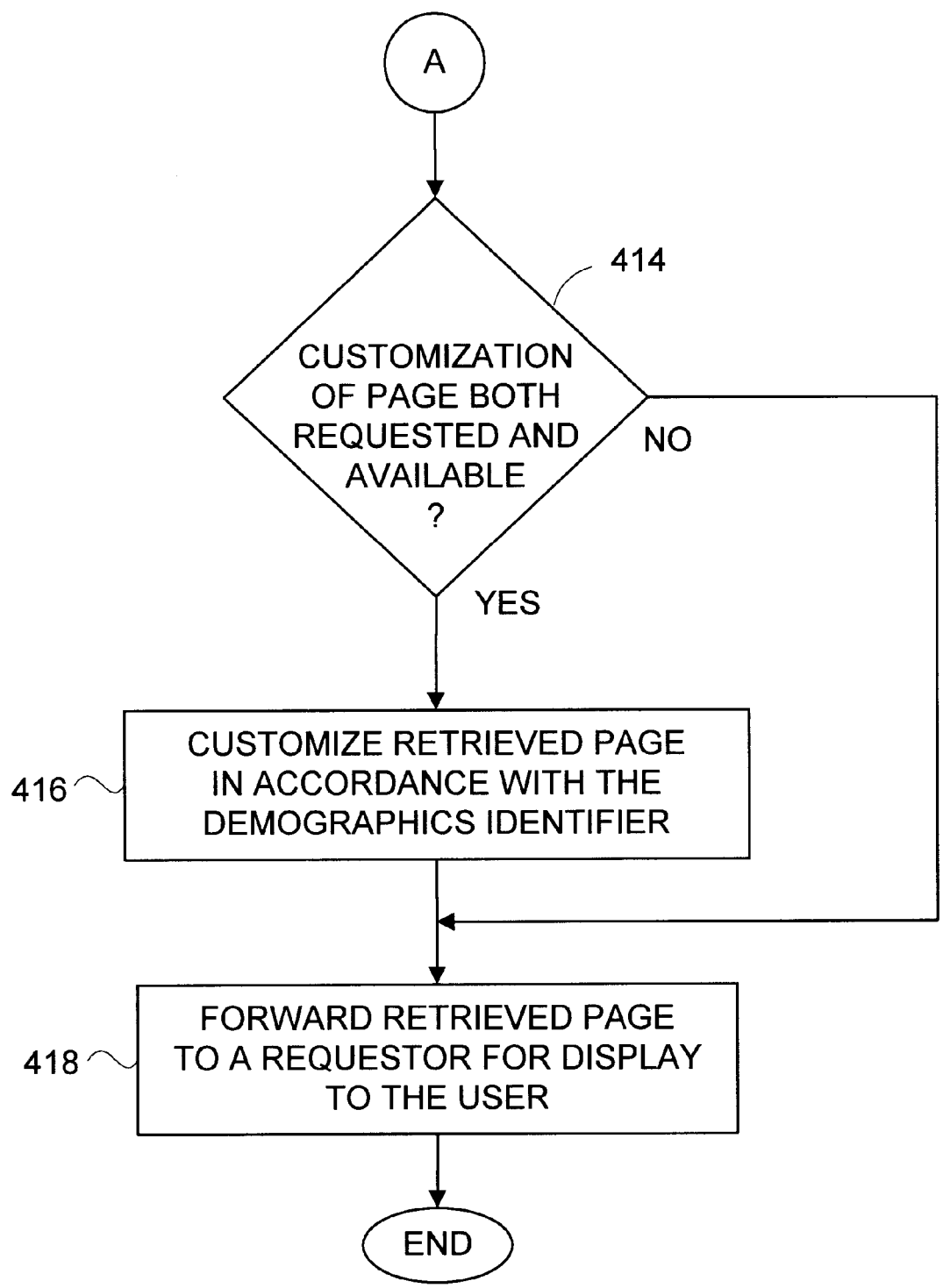

FIGS. 4A and 4B are flow diagrams of referring server processing 400 according to an embodiment of the invention. In this embodiment, the demographics identifier, if available, is assumed to be appended to a page request URL. However, in general, the demographics identifier can accompany or follow the page request in a variety of ways. The referring server processing 400 is the processing carried out by a server such as the referring server 300 illustrated in FIG. 3A.

The referring server processing 400 initially begins with a decision block 402 that determines whether an incoming page request has been received. Until an incoming page request has been received, the decision block 402 causes the referring server processing 400 to await its reception. Once an incoming page request has been received, a decision block 404 determines whether the page request URL includes a demographics identifier. When the decision block 404 determines that the page request URL does not include a demographics identifier, the standard page requested is then retrieved 406. On the other hand, when the page request URL does include the demographics identifier, then a decision block 408 determines whether the server (the referring server 300) offers demographic variants for the requested page. For example, the demographic variants for the requested page could have different pages for different age groups. As another example, the demographic variance could be different for different religious groups, sexes, marital status, job type, income category, etc. When the decision block 408 determines that the server does not offer demographic variants for the requested page, then the decision block 408 causes the standard page requested to be received 406. On the other hand, when the server does offer demographic variants for the requested page, the referring server processing 400 then selects 410 one of the demographic variants for the requested page based on the demographics identifier. Then, the page requested with the selected variance is retrieved 412.

Following blocks 406 or 412, a decision block 414 determines whether customization of the retrieved page is both requested and available. Availability depends on the server sponsoring the requested page, but whether such customization is requested depends on the user, the network browser, and/or the demographics identifier (which could itself so specify). When customization of the page is determined to be both requested and available, the retrieved page is customized 416 in accordance with the demographics identifier. There are many examples of customization, including adding a greeting, selecting an appropriate variant page, selecting an appropriate advertisement to display. On the other hand, when the customization of the page is either not requested or not available, the customization block 416 is by-passed. In any case, following block 416 or following block 414 in a case in which customization is not performed, the referring server processing 400 forwards 418 the retrieved page to a requester for displaying to the user. Optionally, the network browser could perform some or all of the customization using the resources of the user's computer instead of burdening the server providing the page.

Figure 5:
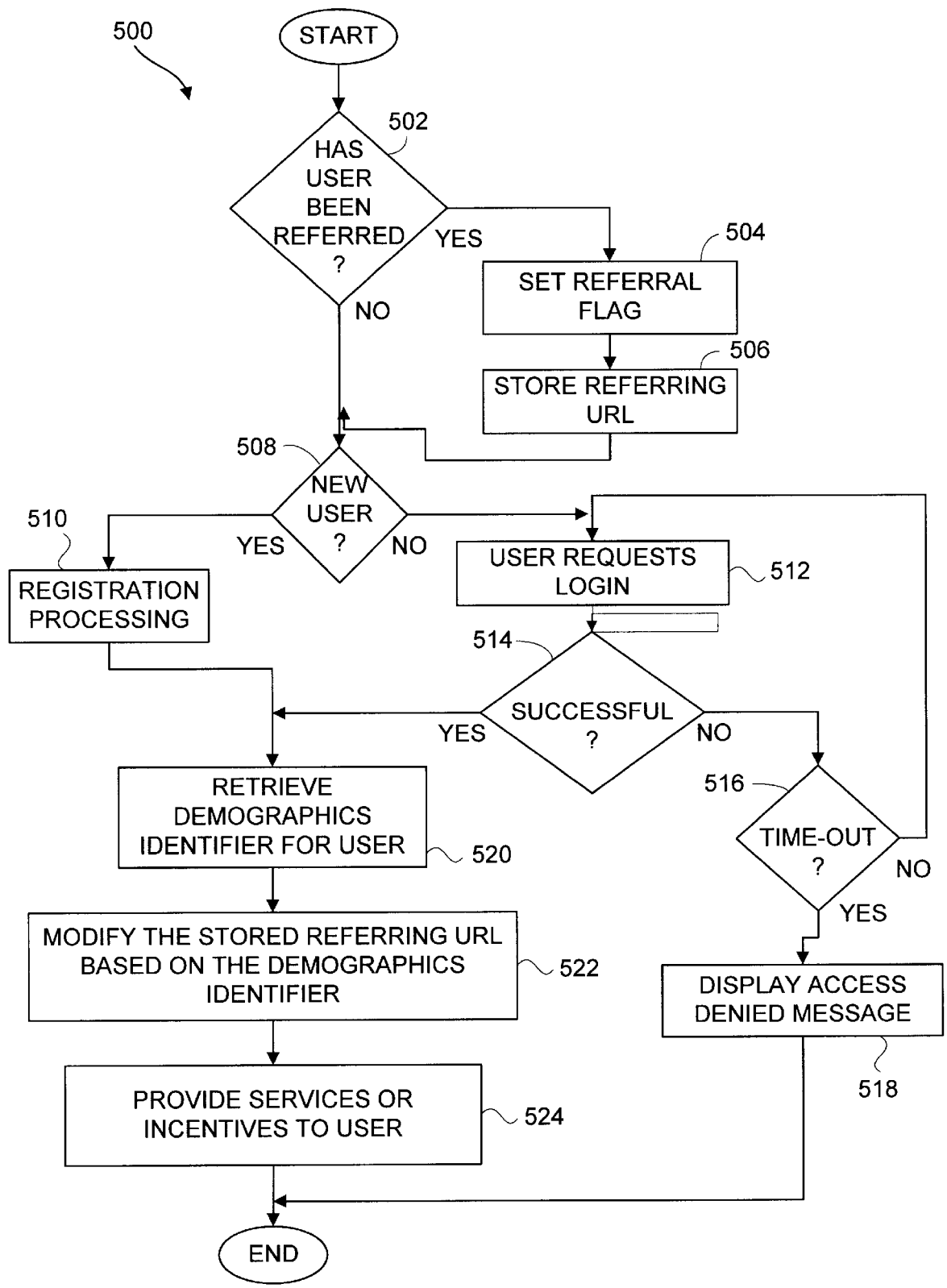
FIG. 5 is a flow diagram of demographic server processing according to an embodiment of the invention.

FIG. 5 is a flow diagram of demographic server processing 500 according to an embodiment of the invention. In this embodiment, the demographics identifier, if available, is assumed to be appended to a page request URL. The demographics server processing 500 is performed by a server such as the demographics identifying server 308.

The demographics server processing 500 begins with a decision block 502 that determines whether the user has been referred. By examining the incoming URL request (or header information) of an incoming page request, the demographics server processing 500 can determine whether the user has been referred to the page now being requested. For example, if the incoming URL has a predetermined referral identifier appended thereto (or found in the header information), the demographics server processing 500 is able to determine that the user has been referred to the page now being requested. For security reasons, the predetermined referral identifier can be encoded. Such security would be useful in preventing access to the demographic information by unauthorized persons or machines. When the decision block 502 determines that the user has been referred, then a referral flag is set 504, and the referring URL (or header) is stored 506. On the other hand, when the user has not been referred, the blocks 504 and 506 are by-passed.

Following block 502 or following block 506 when the user has been referred, a decision block 508 determines whether the user is a new user. When the user is determined to be a new user, registration processing 510 is invoked. The registration processing 500 operates to register the new user with the demographics identifying server 308. By registering with the demographics identifying server 308, the demographics identifying system is able to obtain demographic information about the user and store it for subsequent uses when the user accesses pages on the demographics identifying server or those pages that are referred to by the demographics identifying server pages.

On the other hand, when the decision block 508 determines that the user is not a new user, the user requests to login 512. A decision block 514 then determines whether the login request is successful. If the login request is determined to be successful, the demographic server processing 500 continues. Otherwise, when the login request is determined to be unsuccessful, a decision block 516 determines whether a time-out occurs. The time-out occurs periodically for security reasons that reduce the likelihood of unauthorized access to the system. When the time-out is invoked, an access denied message is displayed 518 to the user. On the other hand, until the time-out is occurs, the demographics server processing 500 returns to repeat block 512 and subsequent blocks.

Following block 510 and following the decision block 514 when the login request is determined to be successful, the demographic server processing 500 operates to retrieve 520 a demographics identifier for the user. The demographics identifier that is retrieved 520 for the user is the demographics identifier stored in the demographics identifier database 316. Then, the stored referring URL is modified 522 based on the demographics identifier. By modifying the referring URL, the demographics identifying system is able to inform the referring page of the demographics information about the user if the user returns to the referring page from the demographics identifying page. Thereafter, the demographics server processing 500 can provide services or incentives to the user. The services or incentives provided to the user are utilized to attract users to the demographics identifying page (the second page 104). As examples, the services or incentives could be a sweepstakes offering, electronic mail services, Internet services, other services, raffles, lotteries, information content, etc. Following block 524 and 518, the demographic server processing 500 is complete and ends.

Figure 6:
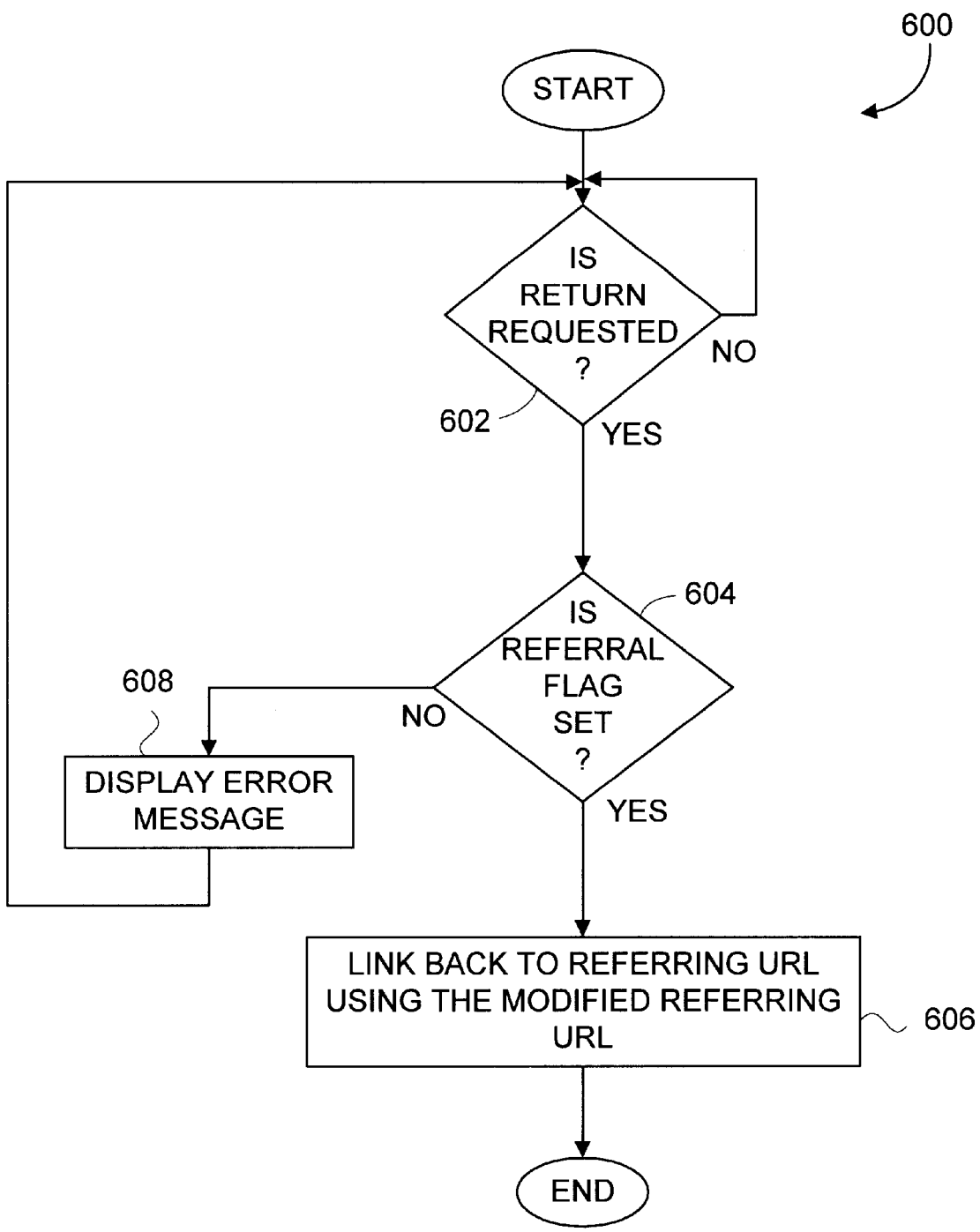
FIG. 6 is a flow diagram of return processing according to an embodiment of the invention.
Figure 7:
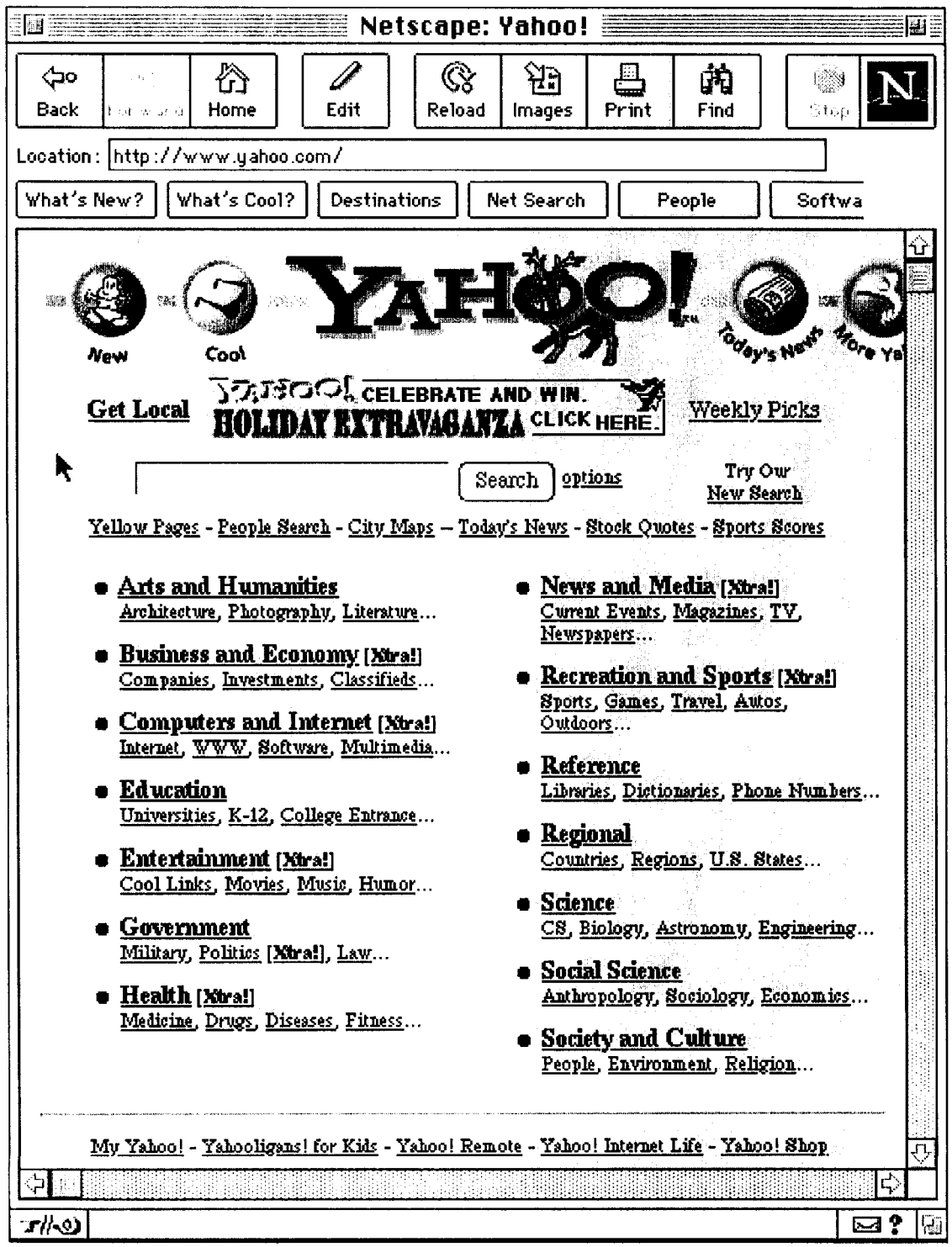
FIGS. 7–11 are graphical images of a series of web pages conventionally provided by an Internet search engine known as Yahoo! for a specific search request.
Figure 8:
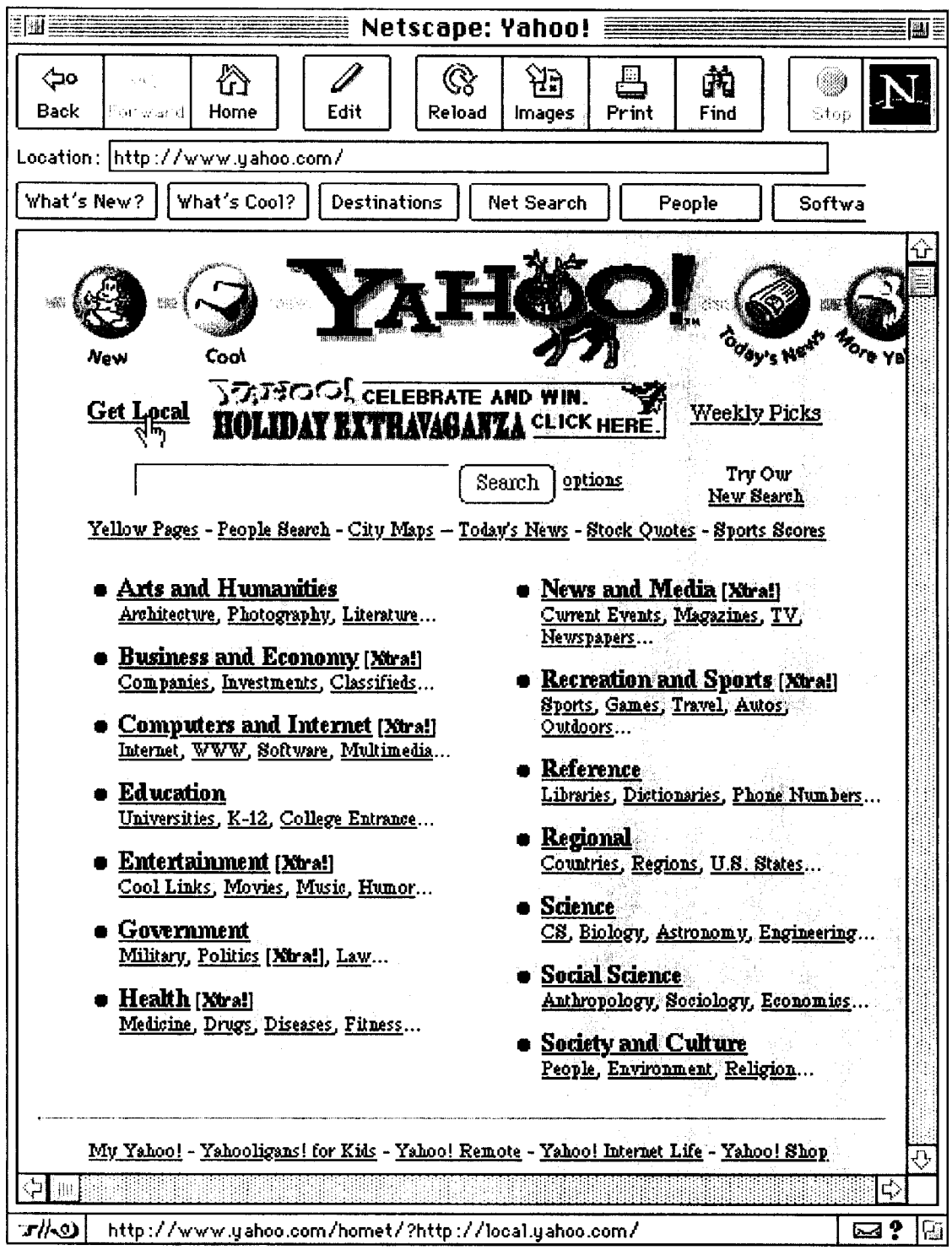
Figure 9:
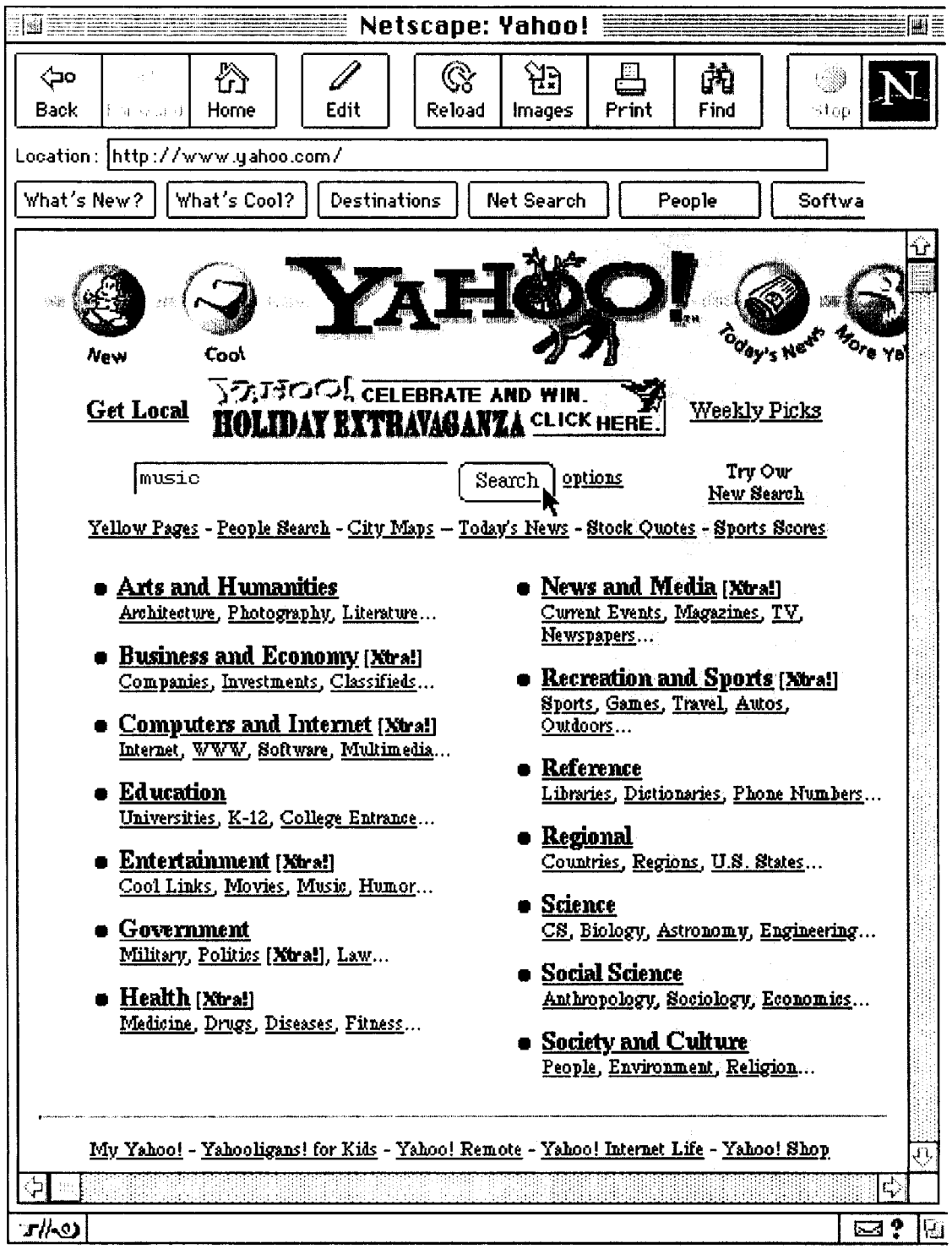
Figure 10:
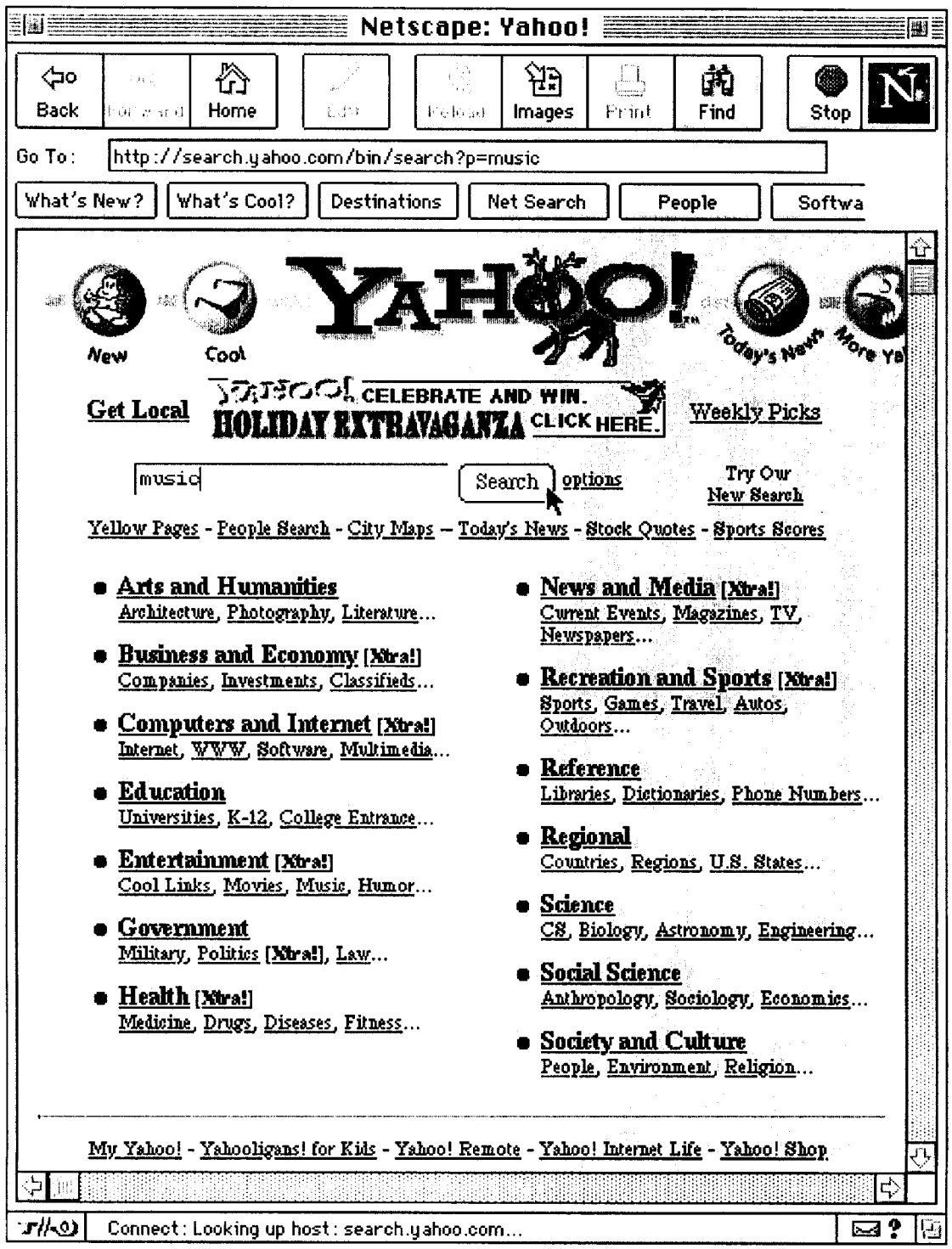
Figure 11:
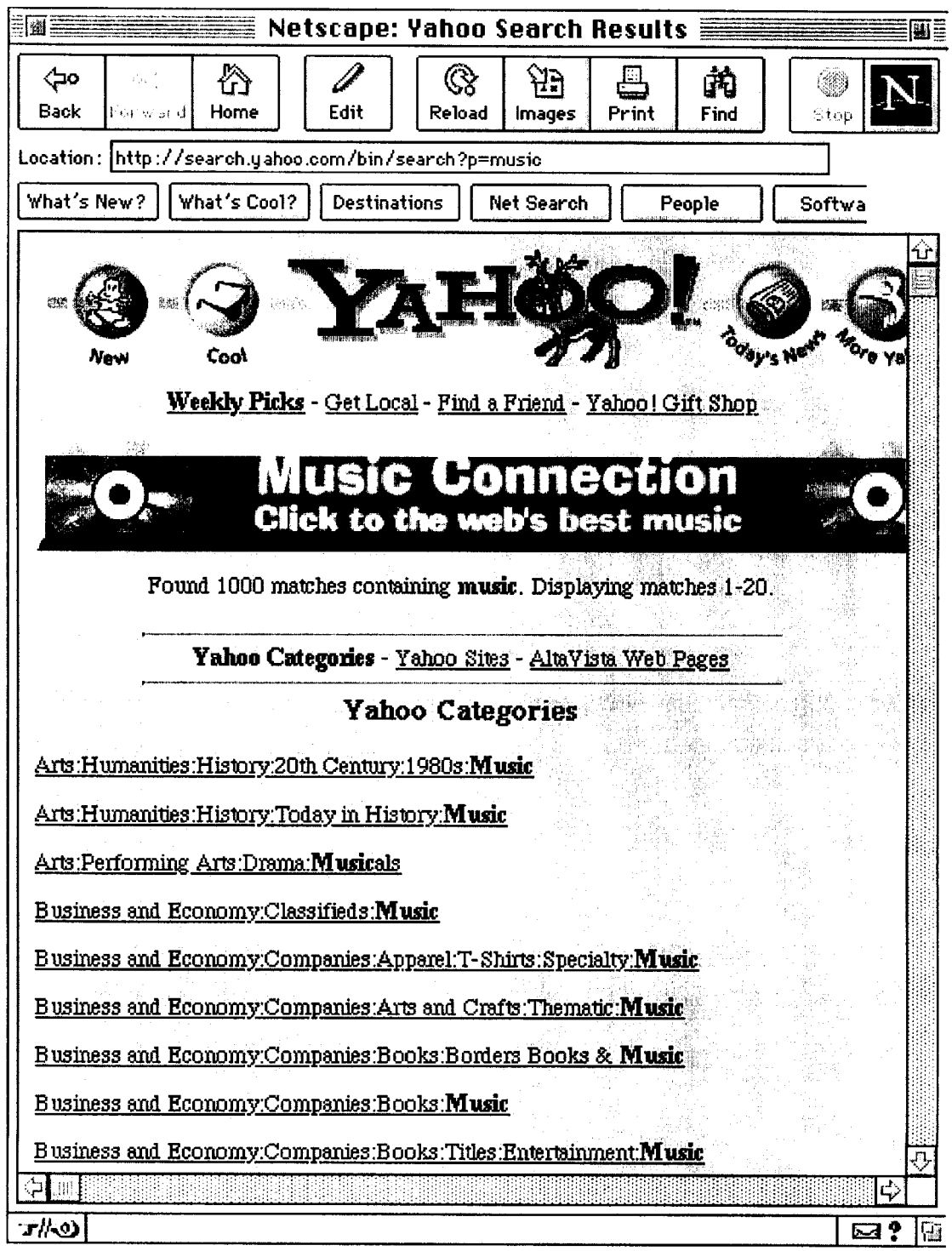

FIG. 6 is a flow diagram of return processing 600 according to an embodiment of the invention. The return processing 600 performs the return operation from the demographics page (the second HTML page 104) to the referral page (first HTML page 102). As an example, the return processing 600 is invoked when the return command button 110 on the second HTML page 104 is selected.

The return processing 600 begins with a decision block 602. The decision block 602 determines whether a return is requested. As an example, a return to the referring page is requested when the return command button 110 is selected. As long as the return command button 110 is not selected, the return processing 600 is basically inactive. Once the return command button 110 is selected, a decision block 604 determines whether the referral flag is set. If the referral flag is determined to be set, then the return processing 600 operates to link back 606 to the referring URL using the modified referring URL. On the other hand, if the decision block 604 determines that the referral flag is not set, then an error message is displayed 608. Following block 608, the return processing 600 returns to repeat blocks 602 and subsequent blocks. In practice, if the referral flag is not set, then the return command button 110 is inactivated so that the return processing 600 is not invoked by the user. In other words, if the user arrived at the demographics page by means other than a referral from a referral page, the return processing 600 is disabled because there was no initial referral. Following block 606, the return processing is complete and ends.

Alternatively, similar processing to the return processing 600 can be performed when the user selects a "Backwards" or "GoBack" icon or button on a graphical user interface provided by a network browser. Here, the block 522 of the demographics server processing 500 should modify the URL saved by the local browser for the "Backwards" or "GoBack" icon or button, then the network browser will automatically link back and provide the demographic identifier to the referring page.

Although much of the above processing pertains to the referral by a server and then return to the server with demographic information, the invention is generally suited for the transmission of demographic information over a network. Once a demographic information aware server is able to identify a user requesting a page from the demographic information aware server, then the appropriate demographic identifier can be retrieved or determined. Once the demographic identifier is available, the demographic information aware server can alter the page being requested so as to utilize the demographic information. Normally, not only can the demographic information server use the demographic identifier, but the network browser and subsequent servers may also be able to utilize the demographic information if they are demographics aware. For example, the demographic information aware server might embed the demographic identifier in the header or body of the requested page for subsequent use by the network browser that has requested the page. The demographic information aware server might also modify all (or certain of) the links in the requested page to append the demographic identifier thereto. Still another example is that the network browser could retrieve the demographic identifier provided with the requested page from the demographic information aware server or provided from the local machine, and then the network browser could modify or customize the pages it displays using the demographic information and/or provide the demographic identifier with subsequent page requests to other demographic information aware servers to receive more appropriate variants and advertising for the requested page based on the demographic information.

As long as the page requests from a page have the demographic information (i.e., appended thereto) and the destination server is demographics information aware (i.e., knows to check and use the demographic information), the demographic information can follow the user across the network.

Additionally, the network browser could also be used to initially provide the demographic information. In this case, page requests from the network browser would contain the demographic identifier so that demographic information aware servers are able to provide more appropriate information to the requester. Here, the operation of the receiving servers is the same but a remote demographics aware server is not needed to provide the demographic information. The network browser could also use a demographic information aware server to initially determine the demographic identifier, and then when the demographic identifier is received from the demographic information aware server, storing the demographic identifier locally at the user's computer so that the network browser can thereafter use it until updated or removed.

The demographic information can be provided in a demographic identifier. The demographic identifier can take many forms and can contain a wide variety of content. One way is that the demographic identifier is a value or code that indicates a specific demographic classification. As one of many possible examples, a demographic identifier of "0015" could indicate that the user is a married, male of age 30–35 and earning 30–50 thousand dollars per year. Another way is that a demographic identifier contains a number of pre-defined fields and then the values in the fields indicate the value or code for the associated demographic category. For example, consider a demographic identifier of "DEMO-ID00A459FF", where "DEMO-ID" is a demographic signal for a company providing the demographic identifier or a particular format for the identifier, and "00A459FF" is a demographic identifier in a hexadecimal notation. In this example, assume that each hexadecimal character is associated with the demographic category shown in the table below.

| CHARACTER | DEMOGRAPHIC CATEGORY |
| --- | --- |
| 1 (bits 1–4) | Male:0; Female:1 |
| 2 (bits 5–8) | Single:0; Married:1; Divorced:2 |
| 3 (bits 9–12) | Age (various age groups) |
| 4 (bits 13–16) | Salary (various salary groups) |
| 5 (bits 17–20) | # of children |
| 6 (bits 21–24) | Job type |
| 7 (bits 25–28) | City and state of residence |

-continued

| CHARACTER | DEMOGRAPHIC CATEGORY |
| --- | --- |
| 8 (bits 29–32) | Political Affliation |

The demographics identifier could also contain (additionally or exclusively) other information about the user beside demographic categories. Examples of such other information are: hobbies; user's preferred greeting name; interests; user preferences, etc. User preference is rather broad and can include preferences for Internet page formats and resolution, types, language, dislikes, likes, customization desired, etc. The other information provided with the demographics identifier is also very useful in customizing a retrieved web page requested by the user associated with the demographics identifier. All this type of information is generally referred to as demographic information above.

The demographic identifier could also use a progressive format and/or compression. Further, available encryption techniques may also be used to encrypt the demographics identifier.

Advantages of the invention are numerous. First, the user is able to receive customized information without having to undergo a burdensome registration or login process for each content server (web site) visited. Second, the demographic classifications, user interests, preferences or other type of demographic information can provide privacy because the various content servers (web sites) visited by the user would not obtain personal information about the user such as name, address, and phone number. Third, the same the demographic classifications, interests, preferences or other type of demographic information can be used by all interested content servers instead of each content server attempting to determine a users identity by their own efforts. Fourth, demographic information on a user of a network can be transmitted over the network, even when the network uses a connectionless protocol (e.g., the Internet). Hence, the demographic information on the user could follow the user on the network so that the server to which the user is visiting would be aware of the demographic characteristics of the user. Fifth, if desired, the distribution of the demographic information can be controlled. For example, a demographics identifier could have a controlled distribution to referring sites or any other sites for registered users such that these authorized sites would be able to identify the demographic characteristics of the user. Sixth, once the user's demographic characteristics are identified, the content provider sites are able to provide customization or appropriate content to the user.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for providing demographic information on a computer network user to machines in the computer network, comprising the acts of:
   (a) obtaining demographic information on the computer network user, the demographic information in the computer network user being entirely self-represented yet the computer network user remains anonymous;
   (b) associating at least a portion of the demographic information to a remote page request, the remote page request being directed to a remote server machine in the computer network; and (c) transmitting the remote page request with at least the portion of the demographic information to the remote server machine over the computer network.

2. A method as recited in claim 1, wherein said associating (b) attaches a demographic identifier to the remote page request.

3. A method as recited in claim 1, wherein the remote page request includes a universal resource locator, said associating (b) appends a demographics identifier to the remote page request, and said transmitting (c) transmits the universal resource locator with the demographic identifier appended thereto to the remote server machine.

4. A method as recited in claim 1,
wherein the computer network is the Internet,
wherein the computer network user interacts with a network browser application program executing on a local machine operatively coupled to the Internet, and
wherein the demographic information comprises at least one of demographic classifications, interests, and preferences of the user.

5. A method as recited in claim 4, wherein said obtaining (a) obtains the demographic information from the network browser application program.

6. A method as recited in claim 4, wherein said obtaining (a) obtains the demographic information from a previously received page from one of the remote server machines in the computer network.

7. A method as recited in claim 6, wherein the demographic information is embedded in the previously received page.

8. A method as recited in claim 6, wherein the demographic information is appended to at least one predetermined link within the previously received page.

9. A computer implemented method for utilizing demographic information over a network of computers, said method comprising the acts of:

(a) receiving a request from a user to access a remote web page over the network;

(b) retrieving self-represented demographic information for the user, the demographic information being self-represented yet the user remains anonymous;

(c) modifying the remote web page for the user based on the demographic information or selecting a previously modified version of the remote web page for the user based on the demographic information,
wherein said modifying operates to modify the remote web page other than with respect to an advertisement or wherein said selecting operates to select a previously modified version of the remote web page in which the modification is other than with respect to an advertisement, and wherein the demographic information used for said modifying or selecting is other than user preferences.

10. A method as recited in claim 9,
wherein said modifying or selecting (c) modifies the remote web page to add a personal greeting to the user, the personal greeting being obtained from the demographic information, and
wherein said method further comprises:

(d) forwarding the modified remote web page to the user for display on a local machine used by the user.

11. A method as recited in claim 9, wherein said modifying (c) modifies one or more links on the remote web page.

12. A method as recited in claim 9, wherein said retrieving (b) retrieves the demographic information from a server machine hosting the remote web page.

13. A method as recited in claim 9, wherein said retrieving (b) retrieves the demographic information from a local machine hosting a network browser used by the user.

14. A method as recited in claim 9, wherein the demographic information is self-represented comprises at least demographic classifications, the demographic classifications include at least one or more of age, gender, martial status, job type, political affiliation, and residence location.

15. A method for customizing web pages provided over a network, comprising the acts of:

(a) receiving, at a server computer, a page request issued by a requestor over the network from a requestor's computer;

(b) retrieving self-represented demographic information on the requestor stored on the requestor's computer and supplying the demographic information to the server computer, the demographic information being self-represented yet the requester remains anonymous to the server computer;

(c) customizing a web page to be displayed on the requestor's computer in response to the page request based on the demographic information; and (d) transmitting the customized web page to the requestor's computer for display thereon.

16. A method as recited in claim 15, wherein the web page includes an advertising section, and wherein said customizing (c) operates to choose an appropriate advertisement to be illustrated in the advertising section based on the demographic information.

17. A method for providing advertisements on HTML pages provided over a network, comprising the acts of:

(a) receiving a HTML page request having a demographics identifier associated therewith, the HTML page request being received from a requester over the network, the demographics identifier representing self-represented demographic information about the requestor yet the requestor remains anonymous;

(b) identifying a data file associated with the HTML page request;

(c) identifying an advertising banner within the HTML page requested;

(d) selecting one of a plurality of available image files for the identified advertising banner based on the demographics identifier; and (e) transmitting over the network to the requester the data file associated with the HTML page requested and the selected image file.

18. A method as recited in claim 17, wherein said method further comprises:

(f) customizing, prior to said transmitting (e), the selected image file in accordance with demographic information associated with the demographics identifier.

19. A method as recited in claim 17, wherein said method further comprises:

(f) receiving, at the requester, the data file and the selected image file transmitted to the requester at a network browser for the requester; and (g) displaying, via the network browser, the HTML page requested with the advertising banner in accordance with the data file and the selected image file received by the network browser.

* * * * *

UNITED STATES PATENT AND TRADEMARK OFFICE
CERTIFICATE OF CORRECTION

| | | |
|---|---|---|
| PATENT NO. | : 6,128,663 | Page 1 of 1 |
| APPLICATION NO. | : 09/021177 | |
| DATED | : October 3, 2000 | |
| INVENTOR(S) | : C. Douglass Thomas | |

It is certified that error appears in the above-identified patent and that said Letters Patent is hereby corrected as shown below:

1. Column 12, line 63, delete "in" and replace with --on--.

Signed and Sealed this
Twenty-first Day of February, 2012

David J. Kappos
*Director of the United States Patent and Trademark Office*